United States Patent [19]

Nowosinski et al.

[11] Patent Number: 4,806,288

[45] Date of Patent: Feb. 21, 1989

[54] PACKING ELEMENTS

[76] Inventors: George B. Nowosinski, 3040 Killybrooke La.; Arthur Miller, 1602 Myrtlewood St., both of Costa Mesa, Calif. 92626; Lech E. Czerniachowski, 2021 San Remo Dr., Laguna Beach, Calif. 92651

[21] Appl. No.: 100,295

[22] Filed: Sep. 23, 1987

[51] Int. Cl.$^4$ .............................................. B01F 3/04
[52] U.S. Cl. ........................... 261/94; 261/DIG. 72; 366/337; 428/34.1
[58] Field of Search ................................ 261/94–98, 261/79.2, 112.1, 112.2, DIG. 72; 210/150; 202/158; 165/166; 428/116, 36; 366/336–340; 55/90, 241, 233

[56] References Cited

U.S. PATENT DOCUMENTS

| | | | |
|---|---|---|---|
| 27,217 | 11/1871 | Eckert | 261/94 |
| 1,365,671 | 3/1918 | Fairlie | 261/DIG. 72 |
| 2,591,497 | 4/1952 | Berl | 261/95 |
| 2,834,466 | 5/1958 | Hament | 261/DIG. 72 |
| 2,911,204 | 11/1959 | Malone | 261/95 |
| 3,266,787 | 8/1966 | Eckert | 261/94 |
| 3,430,934 | 3/1969 | Weishaupt | 261/DIG. 72 |
| 3,506,248 | 4/1970 | Starbuck et al. | 261/94 |
| 3,724,825 | 4/1973 | Streck | 261/95 |
| 4,067,936 | 1/1978 | Ellis et al. | 261/98 |
| 4,115,269 | 9/1978 | Bennett et al. | 210/150 |
| 4,122,011 | 10/1978 | Strigle, Jr. | 210/150 |
| 4,195,043 | 3/1980 | Foote et al. | 261/94 |
| 4,275,019 | 6/1981 | Bednarski | 261/98 |
| 4,366,608 | 1/1983 | Nagaoka | 428/116 X |
| 4,374,542 | 2/1983 | Bradley | 165/166 |
| 4,376,081 | 3/1983 | Leva | 261/94 |
| 4,481,155 | 11/1984 | Frohwerk | 261/94 |
| 4,496,498 | 1/1985 | Pluss | 261/95 |
| 4,497,752 | 2/1985 | Huber | 261/95 |
| 4,511,519 | 4/1985 | Hsia | 261/94 |
| 4,522,767 | 6/1985 | Billet et al. | 261/94 |
| 4,532,086 | 7/1985 | Pluss | 261/94 |
| 4,541,967 | 9/1985 | Masaki | 261/95 |
| 4,557,876 | 12/1985 | Nutter | 261/94 |
| 4,600,544 | 7/1986 | Mix | 261/79.12 |
| 4,604,247 | 8/1986 | Chen et al. | 261/94 |

FOREIGN PATENT DOCUMENTS

| | | | |
|---|---|---|---|
| 2711939 | 10/1977 | Fed. Rep. of Germany | 261/DIG. 72 |
| 2942481 | 4/1981 | Fed. Rep. of Germany | 261/DIG. 72 |
| 70169 | 4/1974 | Poland | 261/DIG. 72 |
| 74693 | 5/1977 | Poland | 261/DIG. 72 |
| 850185 | 7/1981 | U.S.S.R. | 261/DIG. 72 |
| 1573745 | 8/1980 | United Kingdom | 261/DIG. 72 |

Primary Examiner—Richard L. Chiesa
Attorney, Agent, or Firm—Frank J. Uxa, Jr.; Gordon L. Peterson

[57] ABSTRACT

A packing element comprising a peripheral sidewall defining an interior space having a central, longitudinal axis; a plurality of holes in the sidewall each having at least two sides, slanted relative to the axis; and a flap extending from at least one of the slanted sides of each of the holes inwardly into the space.

21 Claims, 3 Drawing Sheets

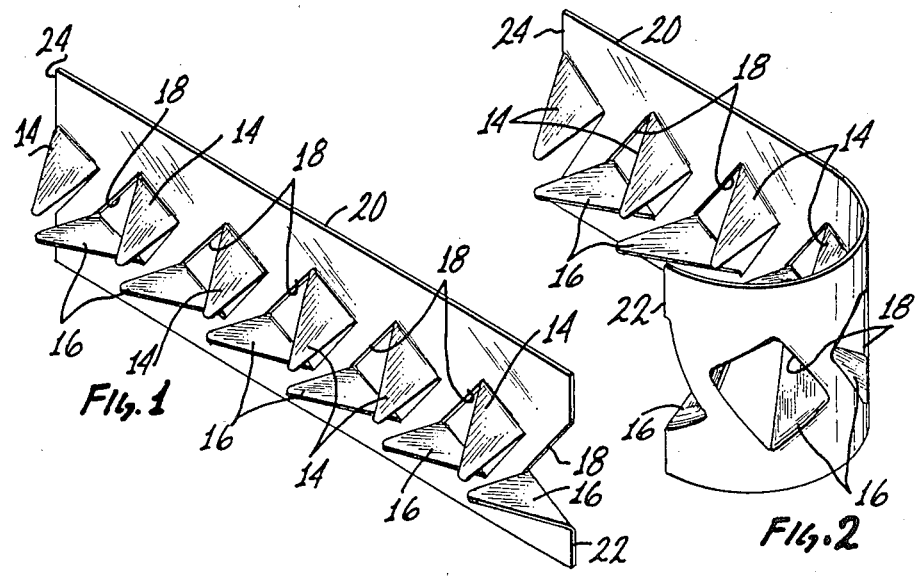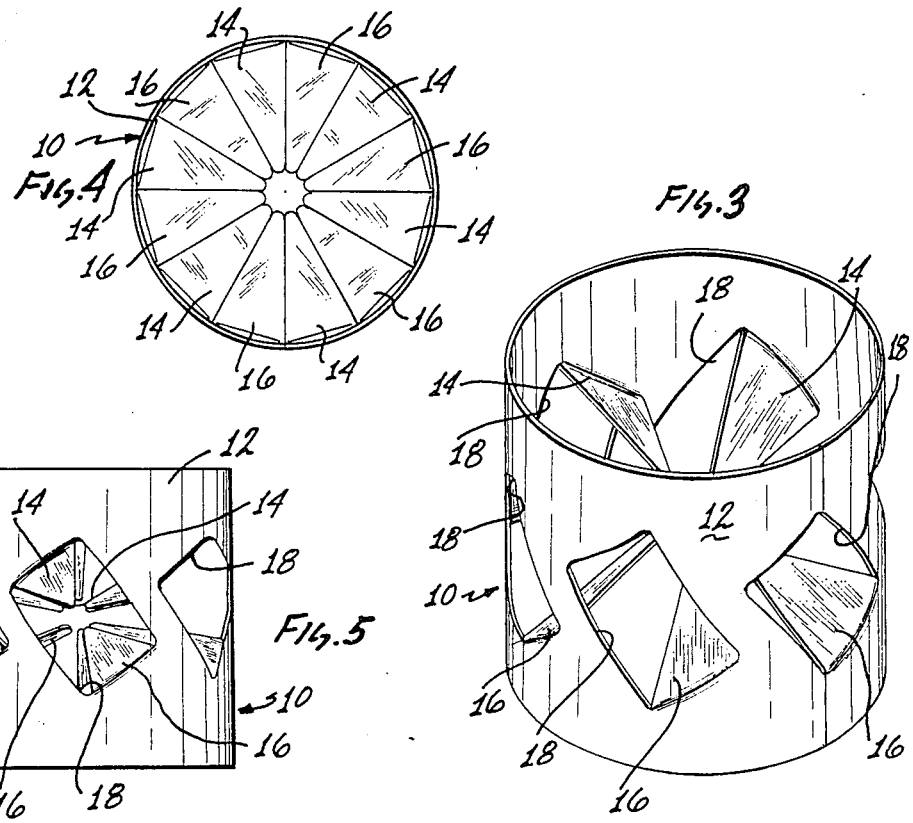

PACKING ELEMENTS

BACKGROUND OF THE INVENTION

This invention relates to packing elements. More particularly, the invention relates to uniquely structured packing elements useful to enhance fluid contact, and preferably mass transfer, in a chamber, e.g., distillation tower, extraction column, chemical reactor, air purification system, other vessel and the like.

A great many differently structured solid elements have been suggested and actually employed to enhance fluid contacting in chambers. Such structures are designed with at least two competing factors in mind. Ideally, the element should have maximum surface area available for contacting, while causing a minimum pressure drop in the chamber. Packing elements have been designed, in large measure, balancing or compromising these two factors.

In preparing the application, the following U.S. patents were considered: U.S. Pat. Nos. 1,365,671; 2,591,497; 2,911,204; 3,266,787; 3,506,248; 3,724,825; 4,115,269; 4,122,011; 4,195,043; 4,366,608; 4,374,542; 4,481,155; 4,496,498; 4,497,752; 4,511,519; 4,522,767; 4,532,086; 4,541,967; 4,557,876; 4,600,544; 4,604,247; and Re. 27,217.

Packing elements known as "Bialecki Rings" have been used in eastern Europe, e.g., Poland. This packing element involves a circular peripheral sidewall having a series of triangular holes therein. The base of each of the triangular holes is perpendicular to the central, longitudinal axis of the individual packing element. Also, the apexes of adjacent triangular holes point in opposite directions, i.e., toward either to top or bottom of the element. The triangular holes are cut or punched out so that for each hole, a triangularly shaped portion of the sidewall is formed and extends inwardly toward the geometric center of the member. The Bialecki Rings provide substantial surface area for fluid contacting. This packing does, however, have a tendency to produce relatively large pressure drops when it is used.

In spite of all the previous work, e.g., referred to above, there continues to be a need for a new packing element.

SUMMARY OF THE INVENTION

A new packing element has been discovered. In one broad aspect, the present packing element comprises a peripheral sidewall defining an interior space; a plurality of holes in the sidewall, each hole having at least two sides slanted relative to the central longitudinal axis of the element; and a flap extending from at least one of the slanted sides of each of the holes inwardly into the space. In one embodiment, each hole preferably has at least four (4) sides with two (2) opposing sides of each of the holes being slanted relative to the central longitudinal axis of the element; and a flap extends from each of the two (2) slanted opposing sides of each of the holes inwardly into the space. In another broad aspect, the packing comprises a peripheral sidewall defining an interior space and at least one projection or projection means extending outwardly from the sidewall and being adapted to restrict the remainder of the sidewall from contacting a solid object, e.g., another packing element, located in proximity thereto.

The present packing elements provide substantial benefits. For example, these elements can be constructed to provide as much or more surface or contact area per unit volume of packing as the Bialecki Rings discussed above. However, because of the slanted orientation of the holes and flaps, the present elements allow fluid to flow through the elements with reduced resistance (e.g., relative to Bialecki Rings of the same nominal size), thereby resulting in reduced pressure drop per unit volume of packing. Without wishing to limit the present invention to any mechanism or theory of operation, it is believed that the slanting orientation of the holes and the flaps not only reduces flow resistance but also facilitates fluid mixing and contacting, e.g., by inducing rotational and preferably turbulent motion of the fluid or fluids both axially and radially relative to the packing element. Thus, the present packing elements have outstanding fluid contacting, and preferably mass transfer, efficiency. Packing elements which include the outwardly extending projection means noted above are effectively prevented from aligning together to preclude fluid contact at the surface or surfaces where the elements contact each other. In effect, the projection means keep the individual elements apart from each other so that an increased amount of the surface area of each element is available for fluid contacting.

Each of the sides of the holes from which the flaps extend is preferably slanted at substantially the same angle relative to the central longitudinal axis of the interior space. This uniformity of orientation provides increased packing efficiency and simplifies manufacturing the elements. Preferably, each of the holes is substantially rectangular in configuration and each of the flaps is substantially triangular in configuration. More preferably, each of the flaps is about one half ($\frac{1}{2}$) of the area of hole. The flaps preferably extend inwardly substantially toward the same point, more preferably substantially toward the geometric center of the element. Again this uniformity and symmetry provides increased packing efficiency and ease of manufacture.

The present packing element can have any suitable configuration. In one embodiment, the peripheral sidewall has a substantially circular cross-section. With this substantially circular cross-section, the space defined by the sidewall is preferably in the shape of a substantially right circular cylinder.

In another embodiment, the sidewall includes a plurality of angularly displaced side segments and is substantially polygonal, e.g., hexagonal, in cross-section. Preferably, each of the side segments is substantially parallel to the central longitudinal axis of the interior space. The sidewall in this embodiment is preferably a substantially regular polygon (i.e., polygonal of substantially equal length sides) in cross-section. Such configuration is particularly useful if a plurality of such elements are to be stacked, i.e., placed in a set or predetermined configuration, in the chamber rather than being located in the chamber in substantially random orientation. Of course, the circular elements can be stacked and the polygonal elements can be randomly oriented.

The present packing element including the slanted holes can further include one or more projections or projection means associated with the sidewall, extending outwardly from the sidewall and adapted to restrict, or inhibit, the remainder of the sidewall from contacting a solid object, e.g., another packing element, located in proximity thereto. This feature is particularly useful if the sidewall is polygonal in cross-section and the packing elements are stacked. At least one of such projection means is preferably located on each of the side segments of a polygonal packing element. In one embodiment, each of the projection means preferably includes an outwardly extending portion, more preferably at least partially defining an elongated hole in the sidewall, substantially parallel to and spaced apart from one of the above-noted slanted, opposing sides of the holes. Because the projections are slanted, preferably each projection slanted at substantially the same angle, the projections of one packing element contact the projections of another packing element only at one point, thus acting to further increase the total surface area available for mass transfer and/or fluid contacting. In the configuration in which elongated holes in the sidewall are formed, the projection means not only act to keep the packing elements apart, but also provide another fluid passageway through which fluid can pass into and out of the interior space defined by the sidewall. Thus, the projection means facilitates increased fluid contacting, and preferably mass transfer.

The present packing elements are useful in any chamber to enhance contacting of fluids, i.e., gases and/or liquids, flowing in the chamber. A plurality of such packing elements are located in the chamber in substantially random orientation or in substantially stacked orientation. The chamber is any space were it is desired to have effective fluid contacting. It may be, for example, a distillation tower, an extraction, column, a chemical reactor, other separation system, other processing vessel and the like.

In another embodiment, the present invention involves a packing unit, e.g., a prepackaged packing unit, comprising as array, preferably a three dimensional, stacked array, of the present packing elements. This packing unit, in which the individual packing elements are held together, e.g., are welded together, are bound together and the like, can be placed in a chamber to enhance fluid contacting. Such packing units are particularly useful when the individual packing elements are polygonal, especially hexagonal, in configuration.

The packing elements of the present invention may be fabricated from any suitable material of construction. The material of construction used may be dependent upon the particular application involved. Of course, the present packing elements should be made of materials which are substantially unaffected, except for normal wear and tear, by the conditions at which the packing elements are used. In addition, such material of construction should have no substantial detrimental effect on the fluids being processed.

The packing elements may be fabricated in any suitable manner, e.g., from elongated strips of material, such as various metals, or from molding polymeric materials.

The size, e.g., diameter, length and the like, of the present elements may be selected to suit the particular application involved. Such elements may have lengths and diameters in the range of about ½ inch or less to about 4 or more.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a front side view, in perspective, of a part used to fabricate an embodiment of the packing element of the present invention.

FIG. 2 is a front side view, in perspective, of the part shown in FIG. 1 partially fabricated into an embodiment of the packing element of the present invention.

FIG. 3 is a top side view, in perspective, of one embodiment of the packing element of the present invention.

FIG. 4 is a top plan view of the packing element shown in FIG. 3.

FIG. 5 is a side plan view of the packing element shown in FIG. 3.

DETAILED DESCRIPTION OF THE DRAWINGS

Figure 6:
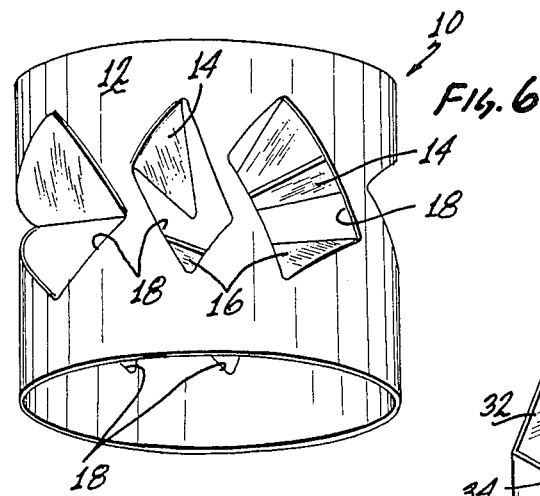
FIG. 6 is a bottom side view, in perspective, of the packing element shown in FIG. 3.

Referring now to the drawings, in particular FIGS. 3, 4, 5 and 6, a circular packing element, shown generally at 10, includes a right circular cylindrical sidewall 12, a plurality of upper flaps 14, a plurality of lower flaps 16 and a plurality of side holes 18.

Each of side holes 18 is substantially rectangular in shape and is slanted at the same angle relative to the central longitudinal axis of element 10. Each of upper flaps 14 and lower flaps 16 is substantially right triangular in shape and extend slantedly from the side of hole 18 substantially toward the same point, i.e., the geometric center of element 10.

Element 10 can be fabricated from an elongated strip of material, e.g., metal, polymeric material and the like. FIGS. 1 and 2 illustrate such an elongated strip, shown generally at 20. Elongated strip 20 is rectangular in shape. Holes 18, are cut through strip 20, and are oriented at an angle, i.e., are slanted, relative to the vertical axis of strip 20. All of holes 18 are slanted at substantially the same angle. In the process of cutting each hole 18, an upper flap 14 and a lower flap 16 are formed. Each of upper flaps 14 and lower flaps 16 is positioned so that when element 10 is fabricated all upper flaps 14 and lower flaps 16 point substantially toward the geometric center of element 10.

As shown in FIG. 2, strip 20 can be bent so that the first end 22 and second end 24 of strip 20 are brought together with upper flaps 14 and lower flaps 16 situated within the space defined by the completely bent strip 20, which becomes sidewall 12.

Figure 7:
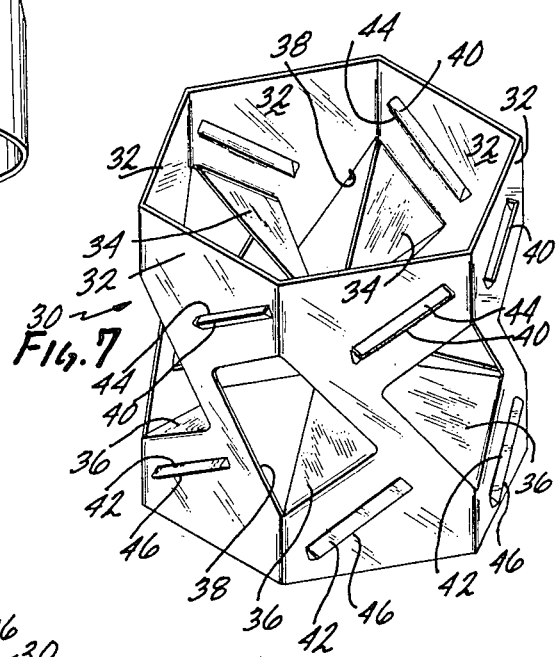
FIG. 7 is a top side view, in perspective, of another embodiment of the packing element of the present invention.
Figure 8:
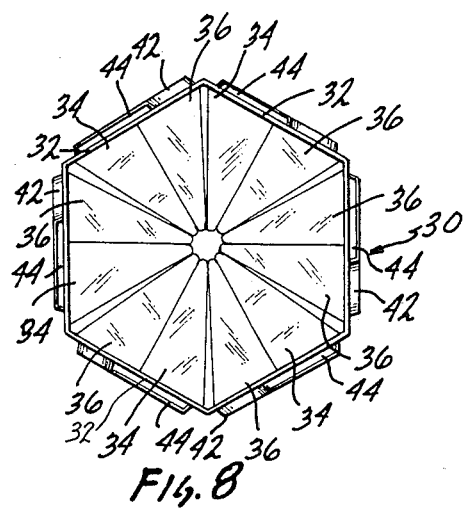
FIG. 8 is a top plan view of the packing element shown in FIG. 7.
Figure 9:
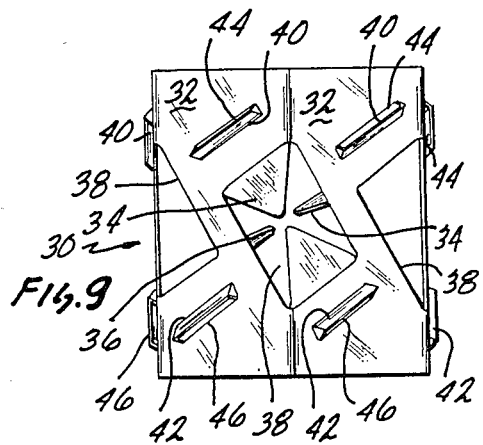
FIG. 9 is a side plan view of the packing element shown in FIG. 7.

Referring now to FIGS. 7, 8 and 9, a hexagonal packing element, shown generally at 30, includes six (6) side segments 32, a plurality of top flaps 34, a plurality of bottom flaps 36 and a plurality of holes 38. Also included are a plurality of top projections 40 and a plurality of bottom projections 42.

Each of the six (6) side segments 32 is the same size and shape, and is situated parallel to the central longitudinal axis of element 30. Side segments 32 are oriented relative to each other so that element 30 is substantially regular hexagonal in cross-section.

Each of holes 38 is substantially rectangular in shape and is slanted at the same angle relative to the central longitudinal axis of element 30. Each of top flaps 34 and bottom flaps 36 is substantially right triangular in shape and extend slantedly from the side of a hole 38 substantially toward the geometric center of element 30. Both top flaps 34 and bottom flaps 36 can be obtained by cutting holes 38 out of side segments 32. One approach to fabricating element 30 involves employing elongated strip 20, as described above. However, instead of bending strip 20 into a right circular cylinder, it is bent to form six (6) side segments 32. Alternately, hexagonal element 30, as well as circular element 10, can be fabricated by molding a suitable material, e.g., a polymeric material, into the desired shape.

Top projections 40 extend outwardly from each of side segments 32. As shown in FIGS. 7, 8 and 9, top projections 40 are associated with top openings 44 in side segments 32, while bottom projections 42 are associated with bottom openings 46 in side segments 32. The longitudinal axis of each of these projections, as well as the longitudinal axis of each of top openings 44 and bottom openings 46 is parallel to the side of the hole 38 which is overall closest to the individual projection or opening.

Top projections 40 and bottom projections 42 need not be associated with any openings, such as top openings 44 and bottom openings 46. These projections may be solid projections or "bumps" on side segments 32. Top projections 40 and bottom projections 42 function to restrict side segments 32 of different elements 30 in close proximity to each other from coming into contact and reducing the amount of surface available for fluid contact and/or mass transfer.

Figure 10:
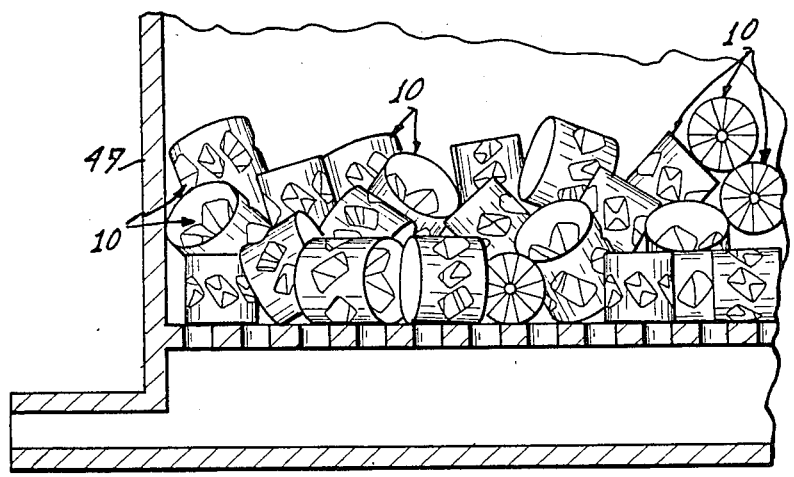
FIG. 10 is a front view, partly in cross-section, showing a plurality of packing elements as shown in FIGS. 3 to 6 randomly placed in a distillation tower.
Figure 11:
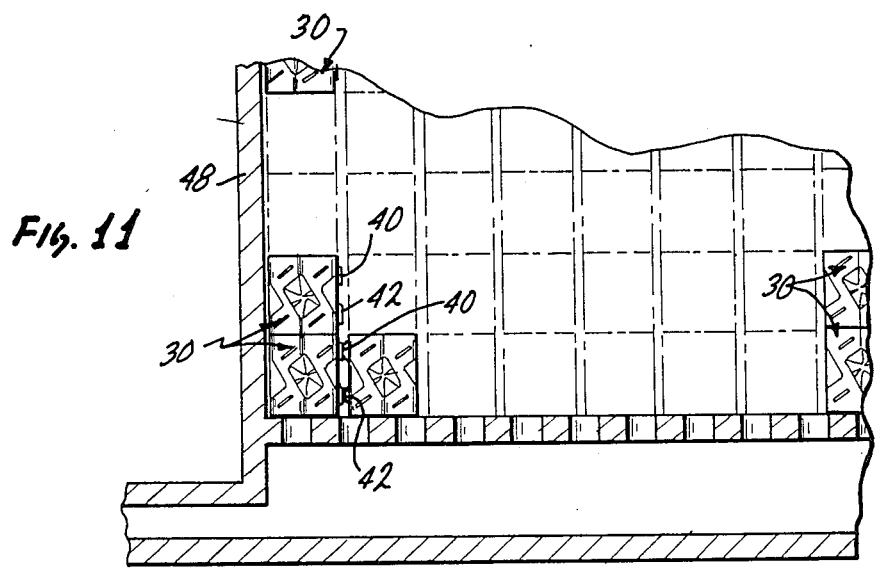
FIG. 11 is a front view, partly in cross-section, showing a plurality of packing elements as shown in FIG. 7 to 9 placed in stacked configuration in a distillation tower.

Both elements 10 and elements 30 may be used randomly packed, or packed in a stacked or ordered configuration. However, it is preferred to have the circular elements 10 randomly packed, and the hexagonal elements 30 packed in a stacked configuration. Therefore, FIG. 10 illustrates a portion of a distillation tower 47 in which a plurality of circular elements 10 are randomly packed. FIG. 11 illustrates a portion of another distillation tower 48 in which a plurality of hexagonal elements 30 are packed in a stacked configuration.

Circular elements 10 can simply be dumped into tower 47 to achieve the random pack.

Hexagonal elements 30 may be manually stacked in tower 48 to obtain the stacked configuration. Alternately, a group of elements 30 can be secured together in a stacked configuration and then placed into tower 48. Elements 30 can be welded together or may be held together with wires, bindings and the like. As best seen in FIG. 11, top projections 40 and bottom projections 42 effectively separate elements 30 from each other. This allows for increased fluid contact surface relative to having two elements 30 with a common surface.

Both circular elements 10 and hexagonal elements 30, either randomly packed or packed in a stacked configuration, provide for effective fluid contacting and mass transfer. Since the flaps are oriented on a slant relative to the central longitudinal axis of the elements, effective mixing of the flowing fluid material is obtained. Further, since the slanted flaps substantially converge at the geometric center from both above and below this point, the flow of the material is not unduly restricted. Effective mixing with no undue flow restriction provides for outstanding contacting/mass transfer efficiency, for example, relative to Bialecki Rings.

While the invention has been described with respect to various specific examples and embodiments, it is to be understood that the invention is not limited thereto and that it can be variously practiced within the scope of the following claims.

What is claimed is:

1. A packing element comprising a peripheral sidewall defining an interior space having a central, longitudinal axis; a plurality of holes in said sidewall each having at least four sides, two opposing sides of each of said holes being slanted at substantially the same angle relative to said axis; and a flap extending from each of said top opposing sides into said interior space substantially toward the same point, the sides of each of said flaps extending into said interior space being substantially straight.

2. The element of claim 1 wherein said flaps are substantially triangular in configuration.

3. The element of claim 1 wherein said sidewall has a substantially circular cross-section.

4. The element of claim 3 wherein said space is substantially right circular cylindrical in configuration.

5. An apparatus for enhancing fluid contact in a chamber comprising a plurality of packing elements as defined in claim 4 located in said chamber in substantially random orientation.

6. The element of claim 1 wherein said sidewall includes a plurality of angularly displaced side segments and is substantially polygonal in cross-section.

7. The element of claim 6 wherein said sidewall is substantially hexagonal in configuration.

8. The element of claim 6 wherein each of said side segments is substantially parallel to said axis and said sidewall is substantially regular polygonal in cross-section.

9. A packing unit useful for inclusion in a chamber to enhance fluid contact in said chamber comprising a three dimensional, stacked array of packing elements as defined in claim 8.

10. The element of claim 6 wherein each of said side segments includes at least one projection means extending outwardly from said sidewall and adapted to restrict the remainder of said side segment from contacting a solid object located in proximity thereto.

11. The element of claim 10 wherein each said projection means includes a outwardly extending portion of said side segment at least partially defining an elongated hole in said sidewall substantially parallel to and spaced apart from one of said slanted sides.

12. An apparatus for enhancing fluid contact in a chamber comprising a plurality of packing elements as defined in claim 10 located in said chamber in substantially stacked orientation.

13. A packing unit useful for inclusion in a chamber to enhance fluid contact in said chamber comprising a three dimensional, stacked array of packing elements as defined in claim 10.

14. The element of claim 1 wherein said sidewall includes at least one projection means extending outwardly from said sidewall and adapted to restrict the remainder of said sidewall from contacting a solid object located in proximity thereto.

15. An apparatus for enhancing fluid contact in a chamber comprising a plurality of packing elements as defined in claim 1 located in said chamber.

16. A packing unit useful for inclusion in a chamber to enhance fluid contact in said chamber comprising an array of packing elements as defined in claim 1.

17. The element of claim 1 wherein each of said flaps has a substantially flat surface.

18. The element of claim 1 wherein said flaps extend substantially toward the geometric center of the element.

19. The element of claim 1 wherein each of said holes has four sides and said flaps are substantially right triangular in configuration.

20. A packing element comprising a peripheral sidewall defining an interior space having a central, longitudinal axis, said sidewall including a plurality of angularly displaced side segments each of which is substantially parallel to said axis and said sidewall is substantially regular hexagonal in cross-section; a plurality of holes in said sidewall each having at least four sides, two opposing sides of each of said holes being slanted at substantially the same angle relative to said axis; and a flap extending from each of said two opposing sides into said interior space, the sides of each of said flaps extending into said interior space being substantially straight.

21. A packing element comprising a peripheral sidewall defining an interior space having a central, longitudinal axis; a plurality of holes in said sidewall each having at least four sides, two opposing sides of each of said holes being slanted at substantially the same angle relative to said axis; and a flap extending from each of said two opposing sides into said interior space, the sides of each of said flaps extending into said interior space being substantially straight, and; at least one projection means including an outwardly extending portion of said sidewall at least partially defining an elongated hole in said sidewall substantially parallel to and spaced apart from one of said slanted sides, said projection means being adapted to restrict said sidewall from contacting a solid object located in proximity thereto.

* * * * *

UNITED STATES PATENT AND TRADEMARK OFFICE
CERTIFICATE OF CORRECTION

PATENT NO. : 4,806,288

DATED : Feb. 21, 1989

INVENTOR(S) : George B. Nowosinski et al

It is certified that error appears in the above-identified patent and that said Letters Patent is hereby corrected as shown below:

Column 6, line 20 change "top" to -- two --.

Signed and Sealed this

Thirty-first Day of October, 1989

*Attest:*

DONALD J. QUIGG

*Attesting Officer*  *Commissioner of Patents and Trademarks*